3,787,476
STYRYL DYESTUFFS
Ernst-Heinrich Rohe and Roderich Raue, Leverkusen, Germany, assignors to Bayer Aktiengesellschaft, Leverkusen, Germany
No Drawing. Filed Jan. 6, 1966, Ser. No. 518,981
Claims priority, application Germany, Jan. 12, 1965, F 44,930
Int. Cl. C07c *121/70*
U.S. Cl. 260—465 D        6 Claims

ABSTRACT OF THE DISCLOSURE

Dyestuffs of the formula

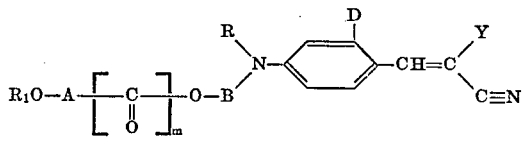

wherein $R_1$ is alkyl, alkenyl, aralkyl, aryl, cycloalkyl, acyl, or carbalkoxy; m is 0 or 1; A is aryl; B is alkylene having 2 to 4 carbon atoms; R is alkyl, aralkyl, or cycloalkyl or

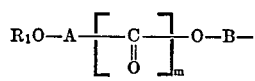

D is hydrogen, alkyl, alkoxy, or halogen; Y is

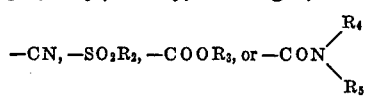

$R_4$ and $R_5$ are hydrogen, alkyl, aralkyl, cycloalkyl, or aryl; and $R_2$ and $R_3$ are alkyl, aralkyl, cycloalkyl, or aryl. The dyestuffs are free from sulphonic acid and carboxylic acid groups and are useful for dyeing cellulose triacetate, polyamide, polyester, and polyurethanes.

---

The present invention is concerned with new valuable dyestuffs of the general formula

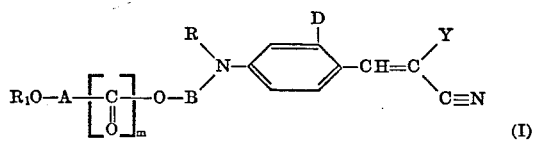

in which $R_1$ means an alkyl, alkenyl, aralkyl, aryl, cycloalkyl, acyl or carbalkoxy radical, m is the number 0 or 1, A is an aryl radical, B is an alkylene radical with 2 to 4 carbon atoms, R is an alkyl, aralkyl or cycloalkyl radical or the group

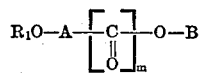

D stands for hydrogen, an alkyl or alkoxy radical or a halogen atom, Y for

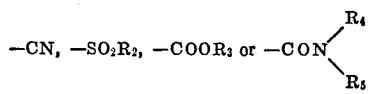

the substituents $R_4$ and $R_5$ for hydrogen atoms, alkyl, aralkyl, cycloalkyl or aryl radicals, and $R_2$ and $R_3$ for alkyl, aralkyl, cycloalkyl or aryl radicals. The dyestuffs are free from sulphonic acid and carboxylic acid groups. The alkyl, aralkyl, cycloalkyl and aryl radicals contained in the General Formula I may contain further non-ionic substituents such as chlorine, bromine, cyano, alkyl, aralkyl. aryl, carboxylic acid ester and possibly N-substituted carbonamide and sulphonamide groups.

The new dyestuffs can be prepared by reacting aldehydes of the general formula

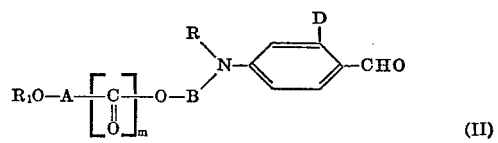

or functional derivatives thereof with methylene compounds of the general formula

wherein R, $R_1$, A, B, D, Y and m have the above meaning. The reaction is carried out at temperatures of 20° to 150° C. in the presence or absence of an inert solvent. Suitable solvents are, for example, methanol, ethanol, dioxan, dimethyl formamide, dimethyl sulphoxide or chloroform. To accelerate the reaction, catalysts may be added, for example piperidine, triethylamine, diethylamine, basic ion-exchangers, potassium hydroxide, sodium alcoholate and potassium alcoholate.

The aldehydes of the Formula II are prepared from the corresponding amines of the general formula

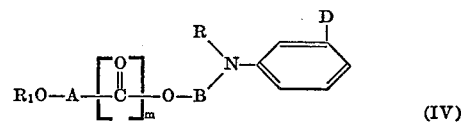

by known methods, for example according to the so-called "Vilsmeier reaction," by reacting with phosphorus oxychloride or with phosgene and dimethyl formamide.

Compounds of the Formula IV in which m is 1 are obtained by the reaction of compounds of the general formula

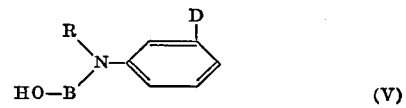

with compounds of the general formula

wherein the radicals A, B, R, $R_1$ and D have the meaning given above and V stands for chlorine, bromine or the imidazolyl radical. This reaction is carried out in the presence of an acid-binding agent such as potassium carbonate, magnesium oxide, pyridine, quinoline, triethylamine, trimethylamine, dimethylaniline, hexahydrodimethylaniline, and, if desired, in the presence of an inert diluent. As inert diluent for this process, there may be used, for example, chlorobenzene, o-dichlorobenzene, toluene, xylene or dioxan.

Suitable compounds of the Formula V, are for example:

N-methyl-N-hydroxy-ethylaniline,
N-ethyl-N-hydroxy-ethylaniline,
N-chloro-ethyl-N-hydroxy-ethylaniline,
N-cyanoethyl-N-hydroxy-ethylaniline,
N-butyl-N-hydroxy-ethylaniline,
N-benzyl-N-hdroxy-ethylaniline,
N-cyclohexyl-N-hydroxy-ethylaniline,
3-methyl-N-methyl-N-hydroxy-ethylaniline,
3-methyl-N-ethyl-N-hydroxy-ethyl-aniline,
3-methyl-N-butyl-N-hydroxy-ethyl-aniline,
3-ethyl-N-ethyl-N-hydroxy-ethyl-aniline,
3-methoxy-N-methyl-N-hydroxy-ethyl-aniline,
3-chloro-N-butyl-N-hydroxy-ethylaniline.

Suitable compounds of the Formula VI are, for example:

4-methoxybenzoyl chloride,
4-ethoxybenzoyl chloride,
3-methoxybenzoyl chloride,
2-ethoxybenzoyl chloride,
2-butoxybenzoyl chloride,
4-allyloxy-benzoyl chloride,
4-benzyloxybenzoyl chloride,
4-phenoxy-benzoyl chloride,
2-β-naphthoxy-benzoyl chloride,
2-p-cresoxy-benzoyl chloride,
2-methoxymethoxy-benzoyl chloride,
2-chloro-3-methoxy-benzoyl chloride,
2-bromo-3-methoxy-benzoyl chloride,
2-(carbomethoxy-oxy)-benzoyl chloride,
4-(carbomethoxy-oxy)-benzoyl chloride,
4-(carbethoxy-oxy)-benzoyl chloride,
4-(carbopropoxy-oxy)-benzoyl chloride,
4-(carbobutoxy-oxy)-benzoyl chloride,
4-propionyloxy-benzoyl chloride,
4-acetoxy-benzoyl chloride,
2-acetoxy-benzoyl chloride,
4-benzoyloxy-benzoyl chloride,
3-benzoyloxy-benzoyl chloride,
4-(p-chlorobenzoyloxy)-benzoyl chloride.

Compounds of the Formula IV are moreover obtainable by reacting substances of the general formula

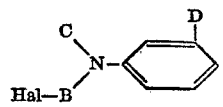

with compounds of the general formula

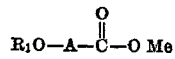       (VIII)

for

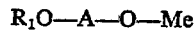       (IX)

In these formulae, the radicals R, R₁, D, A, B have the meaning given above, Hal preferably stands for chlorine and bromine and Me for the equivalent of a metal ion.

Suitable compounds of the Formula VII are, for example: N - methyl - N - β - chloroethyl - aniline, N-ethyl - N - β - chloroethyl - m - toluidine, N,N-di-β-chloroethylaniline, N - cyanoethyl - N - β - chloroethyl-aniline, N - butyl - N - β - chloroethyl - aniline, N-butyl-N - β - bromoethylaniline, 3 - methoxy - N - methyl-N-β-chloroethylaniline, 3 - chloro-N-butyl - N - β - chloro-ethylaniline.

Suitable compounds of the General Formula VIII are, for example, the sodium salts of 4-methoxybenzoic acid, 4-ethoxybenzoic acid, 2-ethoxybenzoic acid, 3-methoxybenzoic acid, the potassium salt of 2-butoxybenzoic acid, the silver salts of 4-allyloxy-benzoic acid, 4-benzyloxybenzoic acid, 4-phenoxy-benzoic acid, the Cu salts of 3-methoxy-benzoic acid, 2-β-naphthoxy-benzoic acid, the potassium salt of 2 - (carbomethoxy-oxy)-benzoic acid, the sodium salts of 4-(carboethoxy-oxy)-benzoic acid, 4-acetoxy-benzoic acid, the magnesium salt of 2-acetoxy-benzoic acid, the lead salt of 4-benzoyloxy-benzoic acid.

Suitable compounds of the General Formula IX are, for example: the sodium salts of hydroquinone-monomethyl ether, resorcinol-monoethyl ether, resorcinol-mono - β - chloroethyl ether, resorcinol - mono--cyanoethyl ether, resorcinol monoacetate, hydroquinone-monophenyl ether, pyrocatechol-monomethyl ether, pyrocatechol-monopropyl ether, pyrocatechol-monophenyl ether, pyrocatechol - o - carboxylic acid ethyl ester, 4-chloropyrocatechol-1- or -2-methyl ether, 1-hydroxy - 4 - methoxynaphthalene, 1-hydroxy - 5 - methoxynaphthalene, 2-hydroxy-3-methoxynaphthalene.

The reaction of the Compounds VIII or IX with the compounds of the General Formula VII is carried out by heating the components for several hours in a suitable solvent, such as, for example, dimethyl formamide, dimethyl sulphoxide, diethylene glycol monomethyl ether.

The metal salts of the compounds of the General Formula VII and IX can also be prepared in an especially advantageous manner by adding the equivalent quantity of a salt to the carboxylic acids or phenols dissolved in the solvents mentioned above.

Methylene compounds of the Formula III suitable for the production of the new dyestuffs are, for example, malonic acid dinitrile, cyanoacetic acid methyl ester, cyanonacetic acid ethyl ester, cyanoacetic acid butyl ester, cyanoacetamide, cyanoacetomethylamide, cyanoacetodimethylamide, methylsulphonylacetonitrile and phenylsulphonyl-acetonitrile.

As functional derivatives of aldehydes of the Formula II, there can be employed the compounds of the general formula

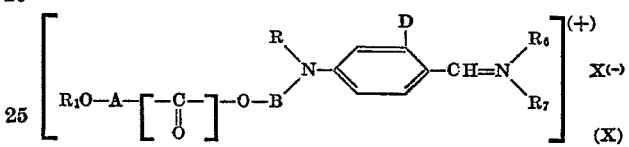       (X)

wherein A, B, D, R, R₁ and $m$ have the meaning given above, R₆ stands for alkyl, R₇ for alkyl or aryl and X for an acid radical, and which are obtained as intermediate products in the Vilsmeier synthesis. The alkyl radicals in the Formulae I to X are preferably lower alkyl radicals having 1 to 5 carbon atoms, such as —CH₃, —C₂H₅, n—C₃H₇, i—C₃H₇, n—C₄H₉ and i—C₄H₉. As particular valuable functional derivatives of aldehydes of the Formula II those are to be mentioned which correspond to the formula

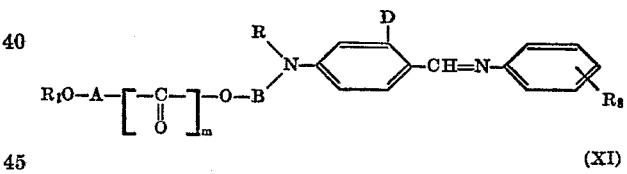       (XI)

wherein R₁, A, B, D, R and $m$ have the above identified meaning and R₈ stands for a carboxylic acid or a sulphonic acid group.

The new dyestuffs (I) are excellently suited for the dyeing and printing of aromatic polyesters, for example these from terephthalic acid and glycol or 1,4-bis-hydroxymethylcyclohexane, or from polycarbonates, for example those from dimethyl-dihydroxydiphenyl-methane and phosgene, and also for the dyeing of synthetic superpolyamides, polyurethanes and of esters of cellulose, especially cellulose triacetate. The dyeings are distinguished by outstanding fastness to light and very good fastness to washing and sublimation. The dyestuffs are also eminently suitable for dyeing at temperatures above 100° C., and in mixed fabrics of wool and polyester they leave the wool component undyed.

In mixtures with blue dyestuffs of the anthraquinone series the new dyestuffs yield green dyeings of excellent fastness to light on fibre materials of cellulose triacetate.

The dyestuffs are also readily soluble in organic solvents and are suited for the coloring of lacquers, oils and synthetic fibres in the mass, as well as for the dyeing of polystyrene and polyethylene. The dyestuffs are moreover soluble with fibre-forming polymers in organic solvents and can be employed in the usual manner in spin dyeing processes.

In the following examples, which are given for the purposes of illustrating the invention, parts stand for parts by weight.

EXAMPLE 1

68.2 parts of the aldehyde of the formula

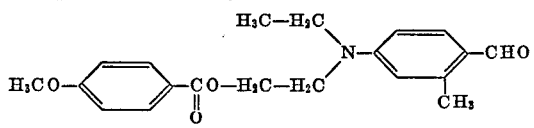

and 13.0 parts malonic dinitrile are heated in 400 parts ethanol, with the addition of 2 parts piperidine, for 2 hours under reflux at boiling temperature. Upon cooling the styryl dyestuff of the formula

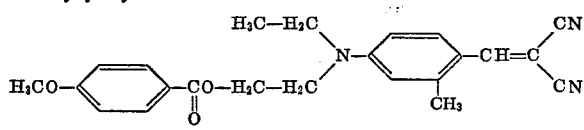

crystallizes out in the form of yellow crystals which are filtered off with suction and recrystallized from ethanol with the addition of dimethyl formamide. 62 parts of a dyestuff of melting point 146–149° C. are obtained. The product dyes polyester and polyamide fibres and also triacetate rayon in clear greenish yellow shades of very good fastness to light, wet processing and sublimation.

If, instead of malonic dinitrile, the equivalent quantity of cyanoacetic acid methyl ester is used and the operation otherwise carried out in the manner described above, a greenish yellow dyestuff of similar dyeing properties is obtained.

100 parts of a fabric of triacetate rayon are heated in a dye bath with 2 parts of the first-mentioned dyestuffs of the present example, 4 parts Marseilles soap and 4000 parts water for 60 minutes at 98–100° C. A greenish yellow dyeing of very good fastness to light and wet processing is obtained.

The aldehyde required for the synthesis of the dyestuffs is obtained in the following manner:

358 parts N-ethyl-N-β-hydroxyethyl-m-toluidine and 228 parts triethylamine are dissolved in 500 parts chlorobenzene, and 383 parts 4-methoxybenzoyl chloride are added dropwise. The temperature rises thereby to 60° C. The product is subsequently heated for 2 hours at 80–100° C. The precipitated triethylamine hydrochloride is filtered off with suction and the filtrate worked up by vacuum distillation. There are obtained 468 parts of the oily reaction product, which boils at 200–210° C./1.5 mm. Hg.

For formylation the substance is dissolved in 1000 parts chlorobenzene and added dropwise at 50–55° C. to a Vilsmeier mixture of 460 parts phosphorus oxychloride and 220 parts dimethyl formamide. After stirring for 12 hours at this temperature, the reaction mixture is decomposed by the addition of ice water and rendered alkaline with a concentrated sodium hydroxide solution. The rising organic phase is separated from the aqueous phase and the aldehyde isolated after the solvent has been distilled off. 443 parts of a thickly viscous dark-colored oil are obtained.

EXAMPLE 2

73.8 parts of the aldehyde of the formula

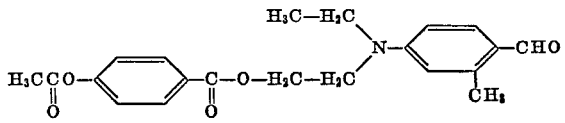

are heated for several hours with 13 parts malonic dinitrile in 400 parts n-butanol in the presence of 2 parts triethylamine, and the dyestuff obtained is precipitated by cooling the reaction mixture.

Yellow crystals of M.P. 76–79° C. are obtained after recrystallization from methanol.

The dyestuff dyes materials of polyesters and polyamide and also of cellulose esters in clear greenish yellow shades of excellent fastness to light, wet processing and sublimation.

100 parts of a fibre materials of polyethylene glycol terephthalate are dyed in a bath which contains 2 parts of this dyestuff and 20 parts of a carrier (cresotic acid ester) in 4000 parts water, first for 15–20 minutes at 80–85° C., then for 60–90 minutes at boiling temperature. A clear, greenish yellow dyeing of eminent fastness to light, washing and exhaust gas is obtained. The dyeing is furthermore characterized by very good fastness to sublimation.

In order to improve the dispersion, the dyestuff in the form of an aqueous paste, may also be thoroughly mixed with the dispersing agent before the dyeing process and employed, after suitable drying, in the form of a dyestuff powder.

If in the preparation of the dyestuff, cyanoacetic acid methylester, cyanoacetamide, cyanoacetic acid benzylamide or methylsulphonyl acetonitrile is used, instead of malonic dinitrile, and the operation is otherwise carried out in the same manner as described above, greenish yellow dyestuffs of similar fastness properties are obtained.

The above-mentioned aldehyde is prepared in the following way:

53.7 parts N-ethyl-N-β-hydroxyethyl-m-toluidine and 33.4 parts triethylamine are dissolved in 400 parts o-dichlorobenzene and treated dropwise with 65.5 parts p-acetoxybenzoyl chloride. The temperature of the reaction mixture rises to 80° C. and the product is stirred, after the exothermic reaction has subsided, for 2 hours at 80–100° C. The solution is then freed from the precipitated triethylamine hydrochloride and formylated at 40–50° C. by means of a Vilsmeier mixture of phosphorus oxychloride and dimethyl formamide. After the customary working up, the aldehyde is obtained as a thickly viscous liquid which can be employed without further purification for the dyestuff condensation.

EXAMPLE 3

40 parts of the aldehyde of the formula

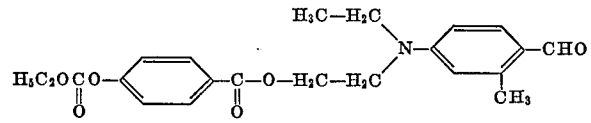

and 6.6 parts malonic dinitrile are condensed with each other as described in Example 1. A yellow methine dyestuff of M.P. 121–124° C. is obtained, which dyes fibres of terephthalic acid polyglycol ester, cellulose esters and polyamide material in clear greenish yellow shades of very good fastness to washing, sublimation and light and with a high yield.

The aldehyde used is obtained by reacting equivalent quantities of N-ethyl-N-O-hydroxyethyl-m-toluidine and p-carbethoxy-oxybenzoylchloride in chlorobenzene in the presence of triethylamine according to the process described in Example 1 and subsequently formylating the product by the Vilsmeier method.

EXAMPLE 4

62.6 parts of the aldehyde of the formula

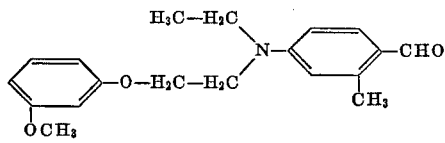

are condensed in 100 parts ethanol with 13 parts malonic dinitrile in the presence of piperidine. A yellow dyestuff of M.P. 140–142° C. is thus formed, which draws in very clear greenish yellow shades of fibres of aromatic polyesters and polyamides and on material of triacetate rayon. The dyeings are characterized by excellent fastness to light, wet processing and sublimation.

25 parts of dyestuff are mixed with 5000 parts polystyrene and melted in the usual manner under nitrogen at about 200° C. The melt is worked up in the usual manner and gives greenish yellow injection-moulded articles of good fastness properties.

100 parts of a fabric of synthetic superpolyamides are introduced at 30–40° C. into a dye bath which contains 2 parts of the styryl dyestuff and 2 parts of a condensation product of aromatic sulphonic acids and formaldehyde in 4000 parts water. The temperature is raised to 96–98° C. in the course of 20–30 minutes and dyeing is carried out at this temperature for 50–60 minutes. A fabric dyed greenish yellow with very good fastness to wet processing and good fastness to light is obtained.

For preparation of the aldehyde mentioned above, 62 parts N-β-chloroethyl-m-toluidine are heated in the presence of parts resorcinol monomethyl ether and 99 parts N-ethyl-28 parts powdered potassium hydroxide in 120 parts diethylene glycol dimethyl ether for 7 hours at 130° C. After the inorganic salts have been removed, the reaction mixture is distilled under vacuum. There are obtained 115 parts of a reaction product boiling at 191–196° C. at 0.8–0.9 mm. Hg, which is subsequently converted into the aldehyde by the action of dimethyl formamide and phosphorus oxychloride. The product is obtained as a pale yellow thickly viscous oil which crystallizes after some time.

The following table gives a survey of a series of further valuable dyestuffs which can be prepared by one of the methods described above. Various radicals and indices are referred to the General Formula I.

| $R_1O-A-[-\overset{\overset{O}{\parallel}}{C}-]_m-O-B-$ | R | D | Y | Shade of the dyestuff on fibres of aromatic polyesters or triacetate |
|---|---|---|---|---|
| 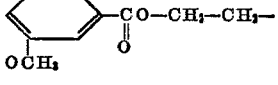 | C₄H₉ | H | CN | Greenish yellow. |
| 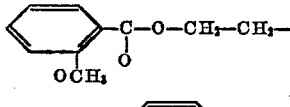 | C₄H₉ | H | COOC₂H₅ | Do. |
| 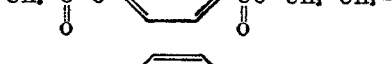 | CH₃ | H | CN | Do. |
| 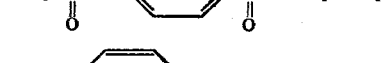 | C₂H₅ | CH₃ | CN | Do. |
| 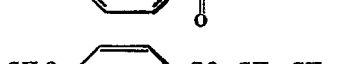 | C₂H₅ | CH₃ | CN | Do. |
| 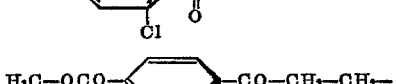 | C₂H₅ | CH₃ | CN | Do. |
| 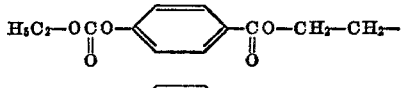 | C₂H₅ | CH₃ | CN | Do. |
| Same as above | C₄H₉ | H | CONH₂ | Do. |
| 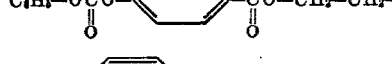 | C₄H₉ | CH₃ | COOC₂H₅ | Do. |
| 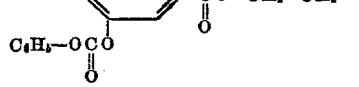 | CH₃ | CH₃ | CN | Do. |
| 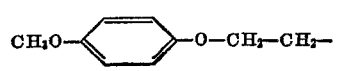 | CH₃ | H | CN | Do. |
| 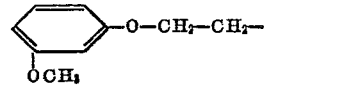 | C₂H₅ | CH₃ | CN | Do. |
| 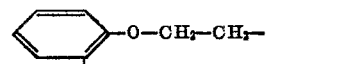 | C₂H₅ | CH₃ | —SO₂C₆H₅ | Do. |
| 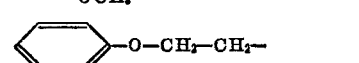 | C₂H₅ | CH₃ | CN | Do. |
| | C₂H₅ | CH₃ | CN | Do. |

TABLE—Continued

| $R_1O-A-\left[-\underset{\underset{O}{\|}}{C}-\right]_m-O-B-$ | R | D | Y | Shade of the dyestuff on fibres of aromatic polyesters or triacetate |
|---|---|---|---|---|
| ![phenyl with -O-CH2-CH2- and OCH2-CH2CN] | $C_4H_9$ | $CH_3$ | CN | Greenish yellow. |
| ![phenyl with -O-CH2-CH2- and OCOCH3] | $C_2H_5$ | $CH_3$ | $COOCH_3$ | Do. |
| ![phenyl with -O-CH2-CH2- and OCOC2H5] | $C_2H_5$ | H | CN | Do. |
| ![naphthyl with H3CO- and -O-CH2-CH2-] | $CH_3$ | H | CN | Do. |
| ![H3CO-phenyl-O-CH2-CH2-] | $H_3CO$—⌬—$O-CH_2-CH_2-$ | H | CN | Do. |

EXAMPLE 5

55.2 parts of the azomethine of the formula

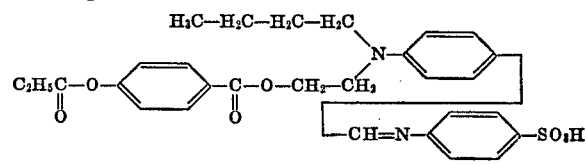

are suspended in 400 parts of ethyl alcohol and 7 parts of malonic dinitrile added. After the addition of 4 parts of piperidine the reaction mixture is heated to the boil within one hour. After cooling 40 parts of the methine dyestuff obtained precipitate in crystalline form. The dyestuff dyes fibres from terephthalic acid polyglycol esters, cellulose esters or superpolyamides greenish yellow shades with very good fastness properties.

The same dyestuff can be obtained if the following azomethines are reacted with malonic dinitrile in the manner indicated above:

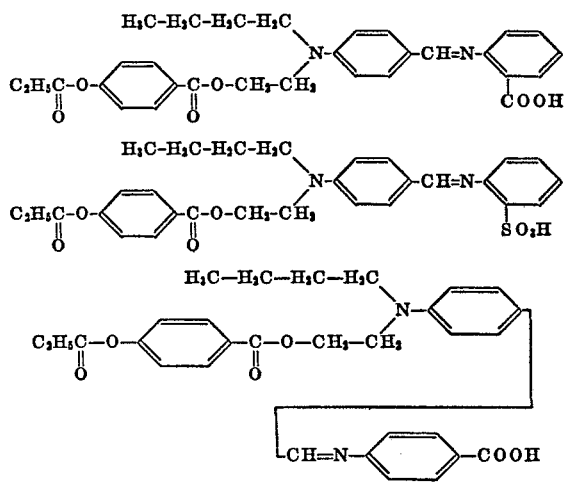

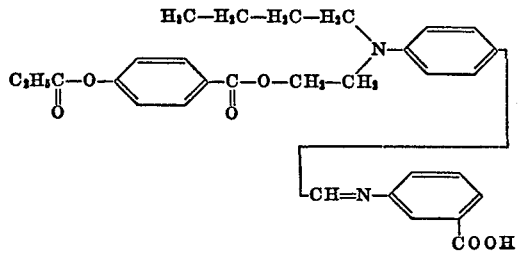

We claim:
1. A dyestuff of the formula:

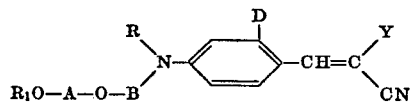

wherein $R_1$ is methyl, ethyl, β-chloroethyl, β-cyanoethyl, acetyl, propyl, phenyl, methoxycarbonyl, or ethoxycarbonyl;
A is phenylene, chlorophenylene, or naphthylene;
B is ethylene;
R is methyl, ethyl, β-chloroethyl, β-cyanoethyl, n-butyl, or

D is hydrogen, methyl, methoxy, or chloro; and
Y is cyano, methoxycarbonyl, ethoxycarbonyl, butoxycarbonyl, aminocarbonyl, methylaminocarbonyl, dimethylaminocarbonyl, methylsulphonyl, or phenylsulphonyl.

2. Dyestuff of claim 1 wherein:
$R_1$ is methyl, β-chloroethyl, β-cyanoethyl, methoxycarbonyl or ethoxycarbonyl;

A is phenylene or naphthylene;
R is methyl, ethyl, n-butyl or
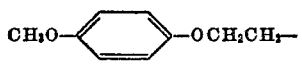
D is hydrogen or methyl; and
Y is cyano, methoxycarbonyl, or phenylsulphonyl.
3. The dyestuff of the formula
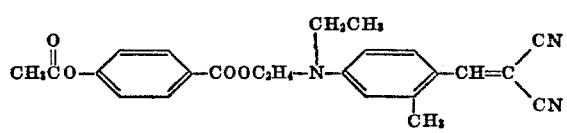
4. The dyestuff of the formula
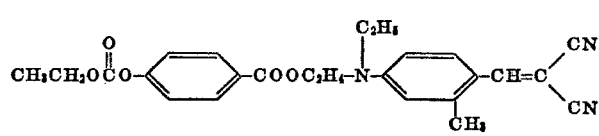
5. The dyestuff of the formula
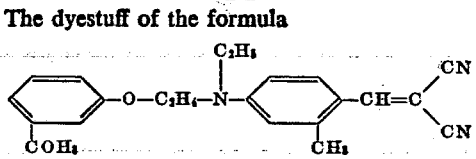
6. The dyestuff of the formula
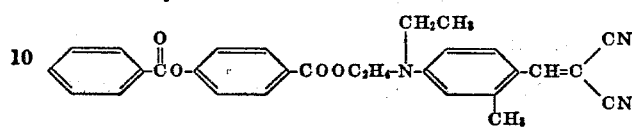
References Cited
UNITED STATES PATENTS
2,583,551   1/1952   Dickey et al. _____ 260—465
2,936,319   5/1960   Merian et al. _____ 260—465
LEWIS GOTTS, Primary Examiner
U.S. Cl. X.R.
260—463, 465 E, 473 R, 475 PN, 566 R, 573